US012603506B2

(12) United States Patent
Inam

(10) Patent No.: US 12,603,506 B2
(45) Date of Patent: Apr. 14, 2026

(54) GRID FORMING OVER DISTRIBUTION GRID WITH RENEWABLE SOURCES AND LOADS

(71) Applicant: Smart Wires Inc., Union City, CA (US)

(72) Inventor: Haroon Inam, San Jose, CA (US)

(73) Assignee: Smart Wires Inc., Durham, NC (US)

( * ) Notice: Subject to any disclaimer, the term of this patent is extended or adjusted under 35 U.S.C. 154(b) by 94 days.

(21) Appl. No.: 17/592,373

(22) Filed: Feb. 3, 2022

(65) Prior Publication Data

US 2023/0109775 A1 Apr. 13, 2023

Related U.S. Application Data

(60) Provisional application No. 63/262,432, filed on Oct. 12, 2021.

(51) Int. Cl.
| | |
|---|---|
| *H02J 3/38* | (2006.01) |
| *H02J 3/01* | (2006.01) |
| *H02J 3/18* | (2006.01) |
| *H02J 3/1842* | (2026.01) |
| *H02M 7/5387* | (2007.01) |

(52) U.S. Cl.
CPC .............. *H02J 3/381* (2013.01); *H02J 3/01* (2013.01); *H02J 3/1842* (2013.01); *H02M 7/53871* (2013.01); *H02J 2300/24* (2020.01); *H02J 2300/28* (2020.01)

(58) Field of Classification Search
CPC .. H02J 3/381; H02J 3/01; H02J 3/1842; H02J 2300/24; H02J 2300/28; H02M 7/53871
See application file for complete search history.

(56) References Cited

U.S. PATENT DOCUMENTS

| | | | |
|---|---|---|---|
| 9,853,445 B2 | 12/2017 | Hosny et al. | |
| 9,866,012 B2 | 1/2018 | Hosny et al. | |
| 10,396,594 B2 | 8/2019 | Fallis et al. | |
| 2005/0012395 A1* | 1/2005 | Eckroad ................. | H02J 9/062 307/44 |
| 2007/0103824 A1 | 5/2007 | Patterson et al. | |
| 2010/0087959 A1 | 4/2010 | Williams, Jr. | |

(Continued)

*Primary Examiner* — Rexford N Barnie
*Assistant Examiner* — Thai H Tran
(74) *Attorney, Agent, or Firm* — Womble Bond Dickinson (US) LLP

(57) ABSTRACT

A system has grid forming capability. A connect-disconnect switch is connectable to a power transmission grid and connectable to a distribution grid that may have renewable energy generation sources and loads. A shunt inverter system comprising a 4-quadrant DC-to-AC inverter and a battery power source is connectable to the distribution grid. A controller controls the connect-disconnect switch to connect and disconnect the distribution grid from the power transmission grid, or disconnect a first segment of the distribution grid from a second segment of the distribution grid. The controller operates the shunt inverter system to provide power factor correction to the distribution grid under normal operation. The controller operates the shunt inverter system with switching and current control instructions to enable grid forming and sustaining of continued operation of the distribution grid.

20 Claims, 6 Drawing Sheets

(56) References Cited

U.S. PATENT DOCUMENTS

| | | | | |
|---|---|---|---|---|
| 2010/0117605 | A1* | 5/2010 | Kretschmann | H02P 29/025 |
| | | | | 322/28 |
| 2010/0327599 | A1* | 12/2010 | Nielsen | F03D 7/0284 |
| | | | | 290/55 |
| 2012/0068540 | A1* | 3/2012 | Luo | H02J 3/32 |
| | | | | 307/44 |
| 2012/0240643 | A1* | 9/2012 | Kleineberg | B60R 25/02142 |
| | | | | 361/139 |
| 2013/0238151 | A1 | 9/2013 | Vaum et al. | |
| 2014/0084695 | A1* | 3/2014 | Fornage | H02J 3/381 |
| | | | | 307/82 |
| 2016/0241032 | A1* | 8/2016 | Zimmanck | H02J 3/14 |
| 2016/0329713 | A1* | 11/2016 | Berard | H02M 5/04 |
| 2017/0250540 | A1* | 8/2017 | Varma | H02J 3/46 |
| 2017/0271973 | A1* | 9/2017 | Jones | H02M 1/12 |
| 2020/0028362 | A1* | 1/2020 | Rowe | H02J 3/38 |
| 2021/0006072 | A1 | 1/2021 | Vestesen | |
| 2021/0249862 | A1 | 8/2021 | Awal et al. | |

* cited by examiner

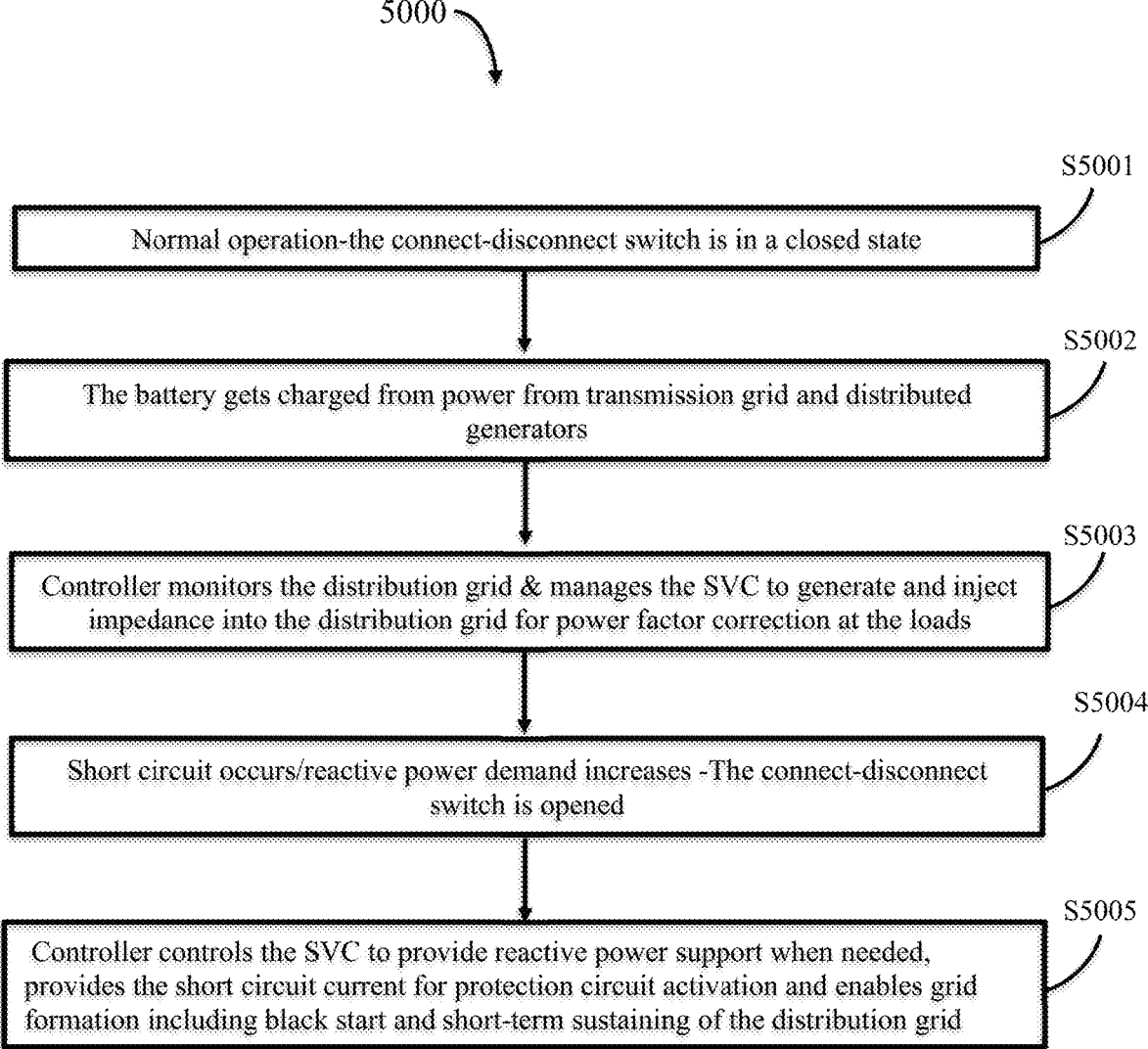

5000

S5001
Normal operation-the connect-disconnect switch is in a closed state

S5002
The battery gets charged from power from transmission grid and distributed generators S5003
Controller monitors the distribution grid & manages the SVC to generate and inject impedance into the distribution grid for power factor correction at the loads S5004
Short circuit occurs/reactive power demand increases -The connect-disconnect switch is opened S5005
Controller controls the SVC to provide reactive power support when needed, provides the short circuit current for protection circuit activation and enables grid formation including black start and short-term sustaining of the distribution grid

Fig. 5

GRID FORMING OVER DISTRIBUTION GRID WITH RENEWABLE SOURCES AND LOADS

CROSS-REFERENCE TO RELATED APPLICATIONS

This application claims benefit of priority from U.S. Provisional Application No. 63/262,432 filed Oct. 12, 2021, which is hereby incorporated by reference.

TECHNICAL FIELD

The technical field of the present disclosure relates to a capability for providing a source for synchronous and reactive power to loads as required connected to the supply so that optimized operation of the distribution supply grid can occur and for forming a grid for supply of power to a power distribution system, all from a flexible alternating current transmission system (FACTS) based full bridge shunt inverter system preferably including at least a 4-quadrant DC-to-AC inverter, a battery/power source and a controller, when a supply disruption happens.

BACKGROUND

FIG. 1 is a diagram illustrating a conventional distribution grid system 100 of today where distribution grid 103 is a medium or low voltage grid that comprises distributed renewable power generators 109 (e.g., a wind generator 109) and 110 (e.g., a solar generator 110) and loads 106 (e.g., a resistive load R), 107 (e.g., an inductive load M), and 108 (e.g., a reactive load Q), respectively. These distributed power generators 109, 110 are coupled to the distribution grid 103 through FACTS controllers 111-1 and 111-2. The loads 106, 107, 108 are distributed within the distribution grid 103, currently shown for clarity as connected to a load bus 113 coupled to the power distribution grid 103 during normal operation. The load bus 113 is shown connected to the distribution grid 103 using a demand-response capable FACTS controller 112. Power is transferred from the power transmission grid 101 to the distribution grid 103 through the step-down transformer 102. Power to the loads 106, 107, 108 is provided by the power supplied by the power transmission grid 101 and the distributed renewable generators 109 and 110 during normal operation. The electromagnetic interference (EMI) filter circuit 104 helps reduce high frequency oscillations on the distribution grid system 100. As indicated in FIG. 1, the distributed renewable power generators 109, 110 and the load bus 113 are all coupled to the distribution grid 103 using FACTS based control units 111-1, 111-2 and 112 respectively, having the needed operational control capability for normal operation of the distribution grid system 100. These FACTS based controllers 111-1, 111-2 and 112 provide a high level of controllability to handle power flow over the distribution grid 103 during normal operation. But these controllers are not suitable for catering to reactive power requirements of the distribution grid 103 when the load characteristics change as loads 106, 107, 108 are added or removed, or when fault conditions happen, such as when the inductive loading of the lines increases beyond the capability of the distribution grid system to provide reactive power or when sudden surge requirements happen due to short circuit conditions. These incidents can result in currents of the order of 3-10× normal magnitude. Typical grid systems need 3 to 10× the normal current or more to activate circuit protections during short circuits. The FACTS control devices 111-1, 2 are not well suited to supply such large currents suddenly. Incidents, when the necessary reactive components required by the loads or the required short circuit currents to enable circuit protections are not provided, can result in unacceptable voltage collapses or high current drain from the distribution grid, which can lead to total system failure.

Therefore, there is a need in the art for a solution which overcomes the drawbacks described above.

SUMMARY

Various embodiments are described herein, for a system with grid forming capability.

One embodiment is a system with grid forming capability. The system has a connect-disconnect switch, a shunt inverter system, and a controller. The shunt inverter system is connectable to the distribution grid and includes a 4-quadrant DC-to-AC inverter, and a battery or power source. The connect-disconnect switch is configured to accept inputs from the controller to connect or disconnect a power transmission grid or a first segment of a distribution grid from a second segment of the distribution grid. The controller is to control the connect-disconnect switch to connect and disconnect the second segment of the distribution grid from the power transmission grid or the first segment of the distribution grid. The controller is to operate the shunt inverter system to provide power factor correction to the distribution grid. The controller is to operate the shunt inverter system with switching instructions to enable grid forming and sustaining of continued operation of the distribution grid.

One embodiment is a method for operation of a power transmission grid and a distribution grid. The method includes controlling, through a controller, a connect-disconnect switch to connect and disconnect a transmission grid or a first segment of a distribution grid from a second segment of the distribution grid having coupled loads. The method includes operating, through the controller, a shunt inverter system that includes a 4-quadrant DC-to-AC inverter and a battery or power source and is connectable to the distribution grid. Operating the shunt inverter system is to provide power factor correction to the distribution grid connected loads when the connect-disconnect switch connects the transmission grid or the first segment of the distribution grid to the second segment of the distribution grid. The method includes operating the shunt inverter system, through the controller, to provide switching and current control instructions to enable grid forming and sustaining of continued operation of the distribution grid in event the connect-disconnect switch has disconnected the transmission grid or the first segment of the distribution grid from the second segment of the distribution grid.

One embodiment is a tangible, non-transitory, computer-readable media having instructions thereupon which, when executed by a processor, cause the processor to perform a method. The method includes controlling, through a controller, a connect-disconnect switch to connect and disconnect a transmission grid and a distribution grid having renewable energy generation resources and loads. The method includes operating, through the controller, a shunt inverter system that is connected to the distribution grid, to provide power factor correction to loads coupled to the distribution grid when the distribution grid is connected to the transmission grid. The method includes operating the shunt inverter system through the controller to provide switching and current control instructions that enable grid forming and sustaining of continued operation of the distribution grid when the distribution grid is disconnected from the transmission grid.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 5 is an example flow chart 5000 showing an embodiment of the invention.

DETAILED DESCRIPTION

Figure 1:
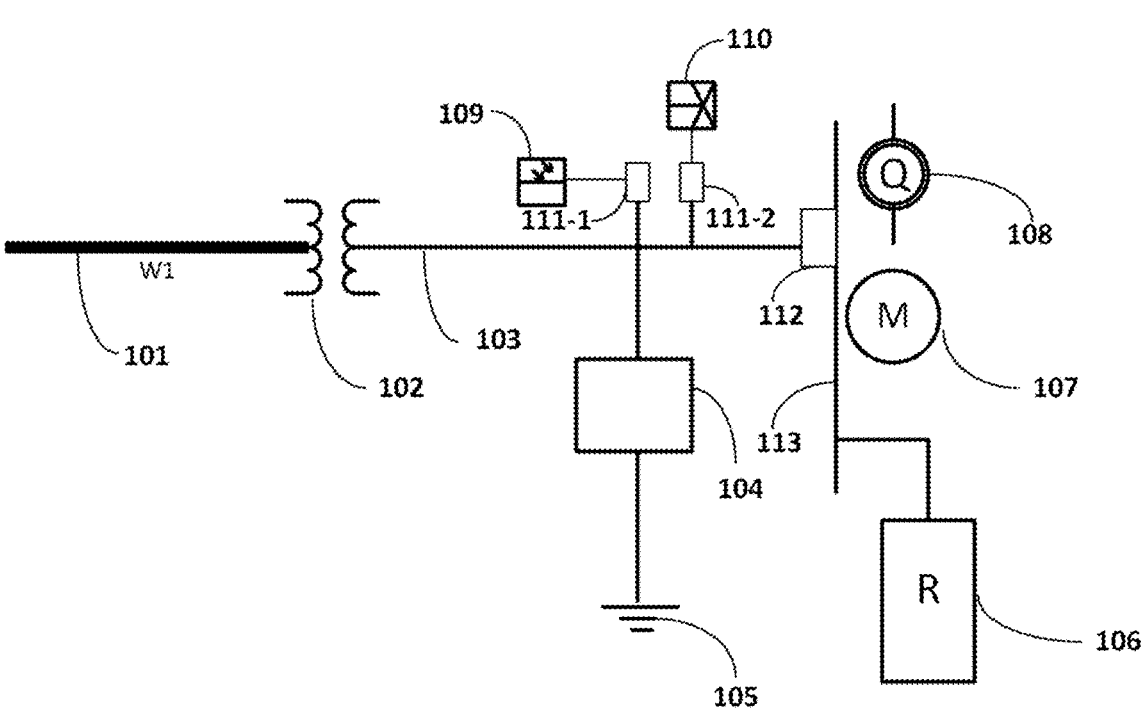
FIG. 1 is a diagram illustrating a conventional simplified distribution grid coupled to a transmission/supply grid as an example of a distribution grid system having multiple loads and renewable resources attached to the distribution grid.

With the advent of distributed local generation from natural green resources such as wind farming, e.g., using wind generator 110, biogas and solar energy, e.g., solar generator 109, that are not predictable, and are typically connected to the medium or low voltage distribution grid 103 as shown in FIG. 1, the control of stability of the grid as a whole and especially the distribution grid has become an important consideration. The recent advances in non-conventional generation, such as wind, solar, geothermal, tidal and wave energy systems, that respond to unpredictable weather and environment-related characteristics and are dispersed across geographical locations, including within the distribution grid 103, coupled with the cyclic and un-predictable nature of consumer demand for power, has made the optimization of power flow over the grid from generation to distribution based on previously established traditional models more difficult and more challenging.

Further, the use of FACTS based control units in the grid and connection of the non-conventional generation sources to the distribution grid and loads to the distribution grid 103 coupled with respective current-source inverters, has resulted in the reduced capacity to supply transient reactive power from the generation sources to the distribution grid 103, when requirements arise. This was previously handled by the traditional rotating power sources over the power grid which are now being augmented by the new renewable generation capability. The FACTS controllers coupling the distributed generation capability and loads to the distribution grid 103 are extremely efficient in controlling the operation of the distribution grid system under normal operating conditions. But when sudden load shifts or short circuit issues occur the FACTS based devices are unable to provide the needed surge currents and transient reactive power needed to keep the system stable. Hence, there is a need for establishing a grid forming capability for the distribution grids 103 that is able to prevent the system from becoming unstable due to voltage instabilities or collapsing under these specific conditions. Furthermore, there is a need for the distribution grid 103, with high penetration of renewable energy sources, coupled with respective FACTS based current-source inverters, to provide sufficient surge current in the event of a short circuit, to activate the protection circuitry in a short time. This is needed to prevent damage to the load devices, e.g., loads 106, 107, 108, and to the components of the distribution grid system. It also prevents power outages or blackouts.

Figure 2:
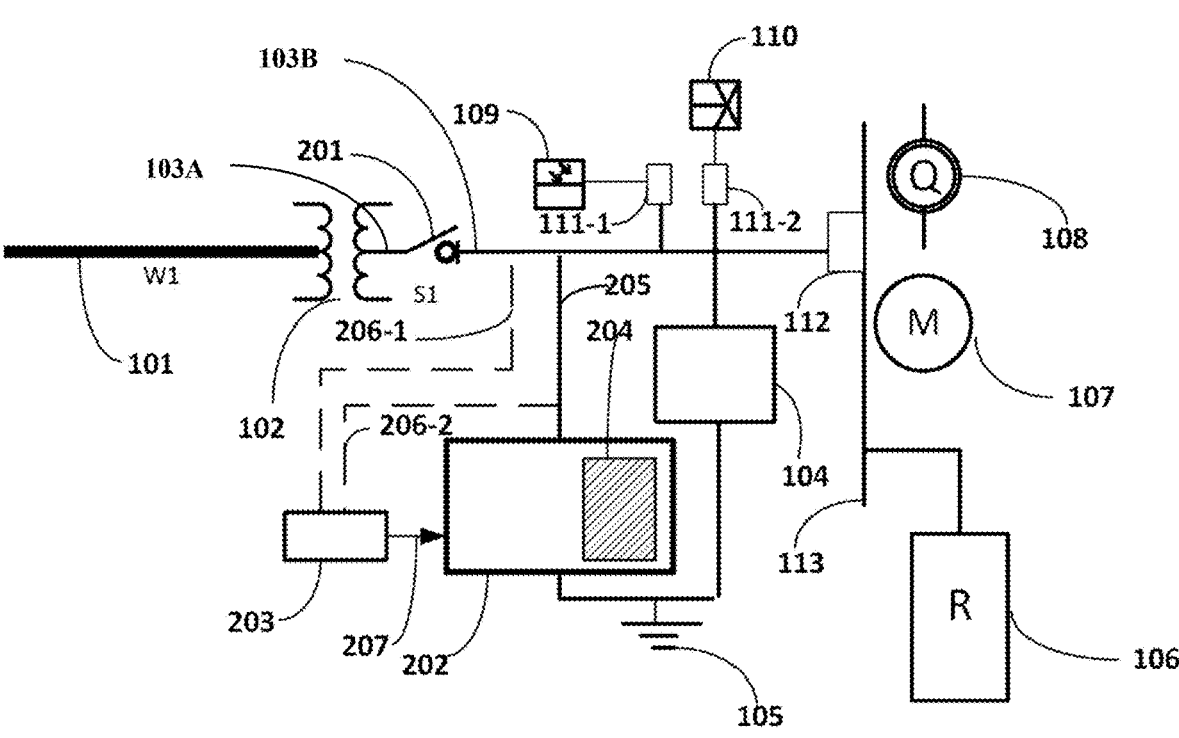
FIG. 2 is a schematic diagram of a grid forming capability with parallel connected full bridge inverter system including at least a 4-quadrant DC-to-AC inverter (four quadrant inverter), a battery/power source and a disconnect switch that enable the distribution grid to be disconnected from the transmission/supply grid when needed according to an embodiment.

FIG. 2 is a schematic diagram of a distribution grid system with a capability for grid forming according to an embodiment. In FIG. 2, distribution grid system 200 includes a connect-disconnect switch 201. The connect-disconnect switch may be a typical switch combination of a vacuum interrupter combined with a recloser switch that is used in power grid applications. In the present application the connect-disconnect switch is configured to connect and disconnect a distribution grid second segment 103B from a first segment 103A of the distribution grid, that is connected through a secondary winding of a transformer 102 to the power supply/transmission grid 101. The primary of the transformer 102 is connected to the power transmission grid 101 and forming a segment of the power transmission grid (also designated as part of 101). During an identified problem such as a sudden incidence of a reactive load coming on line in the distribution grid 103 creating a voltage instability in the grid system that, if not corrected, can lead to a power system failure, the switch 201 is used to disconnect the distribution grid segment 103B from the distribution grid segment 103A and the power transmission grid 101. Alternately if a short circuit in the power transmission grid 101 or the distribution grid segment 103A happens, that can create disturbances and oscillations leading to power grid system trip conditions and power grid shut down, the switch 201 is used to isolate and protect the loads and power sources on distribution grid segment 103B. The second segment of the distribution grid, that is the distribution grid 103B, will typically include the coupled renewable energy generation resources, that are power generators and the and loads that draw power for operation. In the case of a short circuit in the transmission grid 101, the connect-disconnect switch 201 is used to isolate and protect the load and the distributed generation capability coupled to the distribution grid segment 103B. Though the preferred application of the connect-disconnect switch 201 is indicated as being to disconnect the distribution grid segment 103B from the first distribution grid segment 103A and hence from the transmission grid 101 it is not to be considered limiting. The connect-disconnect switch 201 may also be used to disconnect a first segment 103A of the distribution grid from a second segment 103B of the distribution grid in various embodiments. In the case of a sudden demand for reactive power or a short circuit in the distribution grid segment 103B, the connect-disconnect switch 201 is used to prevent voltage and system instability arising out of the specific condition at the distribution grid from impacting the operation of the transmission grid 101 and the grid system as a whole until corrective action is initiated and completed. Though FIG. 2 shows one each of the distribution grid segments 103A and 103B, as well as one power transmission grid 101, it is not to be considered limiting. Other grid feeders/power transmission grid(s) 101, and other load busses, for example further distribution grids 103, may all connect to the power system directly or via recloser/connect-disconnect switches, for example further connect-disconnect switches 201.

A FACTS based full-bridge shunt inverter 202, which preferably includes the four-quadrant inverter 401 that is configured to operate as 1) a current source/active filter and/or (2) as a voltage source with high-current capability in the disclosed application, is shown. In current source mode, it acts like a static VAR compensator (SVC) or augmented high-current active filter. In voltage mode, it can provide very high currents and VARs demanded by load and as a result of control the system voltage. As indicated previously, the full bridge shunt inverter system 202 includes the four-quadrant inverter 401 having four sets of switching components 402, which can be for example insulated gate bipolar transistors (IGBTs) 502A, B, C, D or other high power electronic switch devices such as Thyristors that have similar functional switching characteristics, configures as the four-quadrant inverter 401. The switching components 402 are individually controllable by associated control capability 501A to 501D, that are are controlled by instructions received via the control link 207 from a control module 203 enabled to control the full bridge shunt inverter system 202. The full bridge shunt inverter system 202 includes a storage battery/power source 204 coupled to the four-quadrant inverter 401 having sufficient storage/power delivery capacity and low-enough source impedance, to supply any surge current requirements and reactive current requirement that arise at the load. The storage battery/power source 204 can have a volt-ampere rating sufficient to keep the distribution grid alive for a period greater than the typical supply fail durations.

Even though the preferred implementation is described using the full bridge shunt inverter system, it should not be considered limiting in any sense. Alternate shunt inverter systems such as 3 level inverter, N-level inverter, Cascaded H-bridge inverter, or any other applicable shunt inverter that can operate in the manner specified for the shunt inverter system 202 may be used.

Figure 3A:
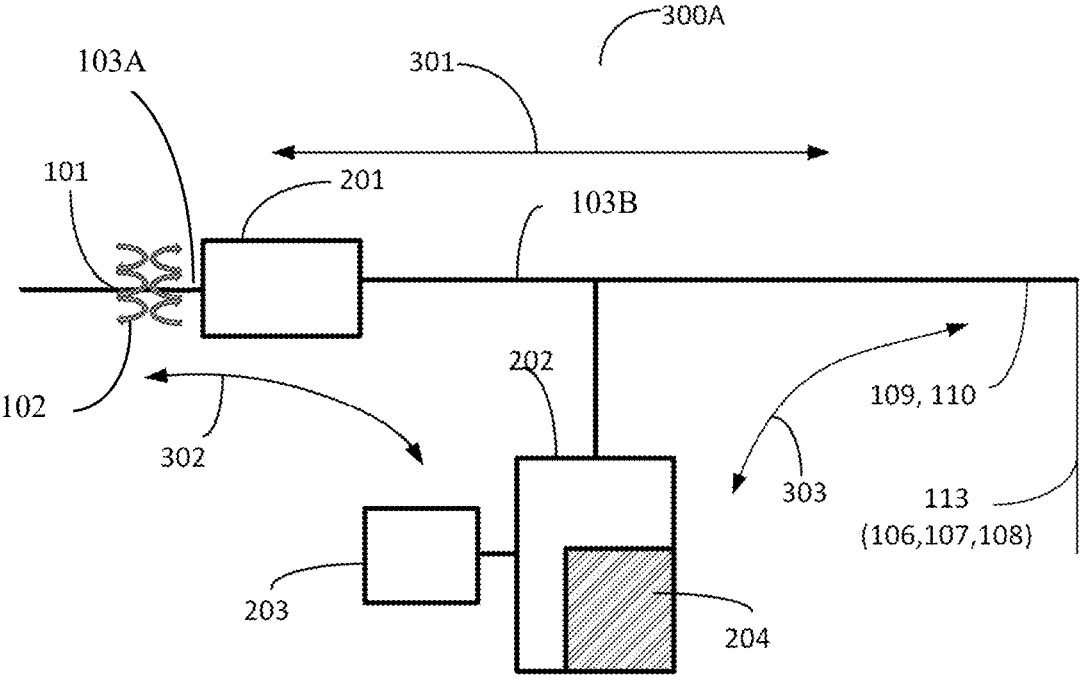
FIGS. 3A-3B are block diagrams showing an operation of the full bridge inverter system with the 4-quadrant DC-to-AC inverter coupled to the re-chargeable battery/power source in normal operation configuration with the disconnect switch shorted and in grid forming configuration with the disconnect switch enabled according to an embodiment.
Figure 3B:
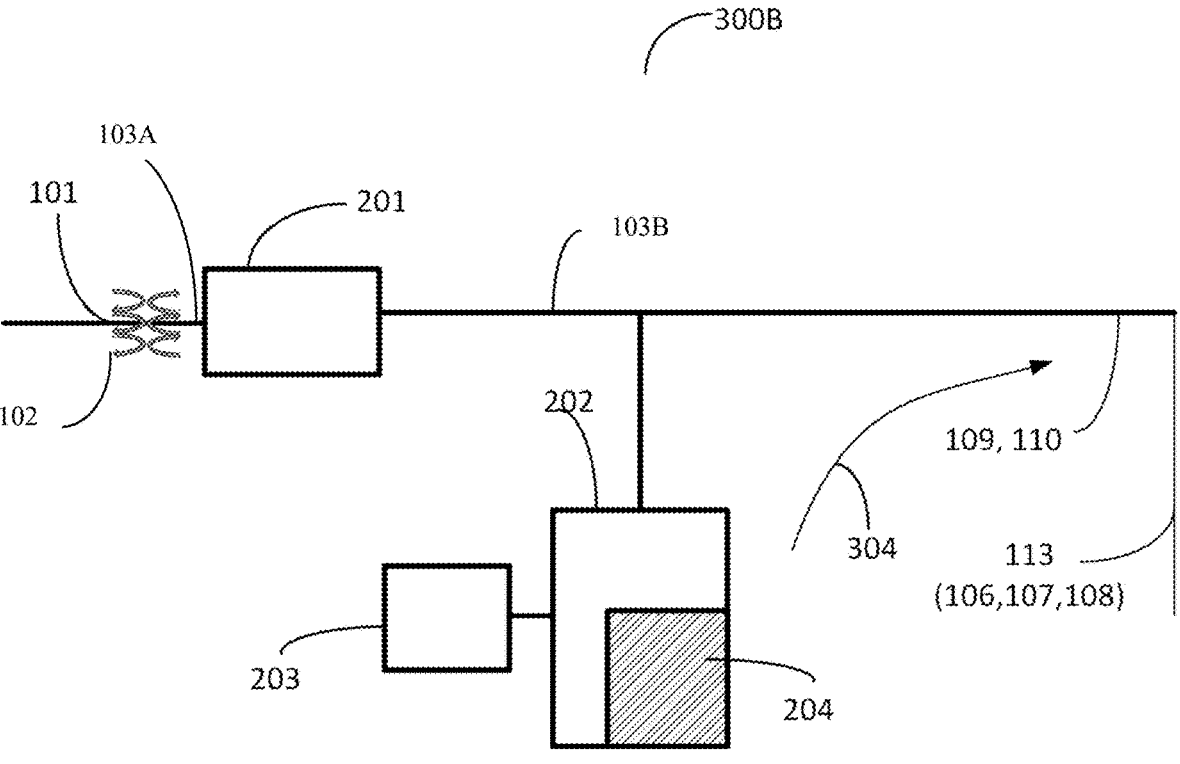

FIGS. 3A-3B are block diagrams showing operation of the full bridge shunt inverter system 202 having grid forming capability in normal operation configuration with the disconnect switch shorted, and in grid forming configuration with the disconnect switch disconnecting the transmission grid from the distribution grid according to an embodiment. Referring to FIGS. 3A and 3B, the operation shows the power flow within a distribution grid system (e.g., distribution grid system 200 of FIG. 2) in two possible conditions of connect-disconnect switch 201. The first condition, case 1, is where the connect-disconnect switch 201 connects the power transmission grid 101 to the distribution grid 103, as depicted in FIG. 3A. The second condition, case 2, is where the connect-disconnect switch 201 is open to disconnect the power transmission grid 101 from the distribution grid 103, as depicted in FIG. 3B.

In one embodiment, the controller 203 is continuously monitoring the grid, in the first case, outputting the power correction impedance, and in the second case providing reactive power support and grid forming capability. This includes providing short circuit surge current for protection circuits to be activated as well as short-term sustaining capability to the working distribution grid.

In the first case, case 1 as depicted in FIG. 3A, the four-quadrant inverter 401 and the battery supply of the full bridge shunt inverter 202 may be used to provide power factor correction for the loads 106, 107, 108 connected to the distribution grid 103 during normal operation. This enhances the power flow in the distribution system. The full bridge shunt inverter 202 may also be used to source low total harmonic distortion (THD) current waveforms that enhance power flow to load from the power supply grid 101.

The storage battery of the battery/power source 204, when inactive, gets charged in normal operation from the power supplied both by the power transmission grid 101 and the power from the distributed natural resource-based generators, for example wind generator 110 and solar generator 109, coupled to the distribution grid 103 using FACTS controllers 111-1 and 111-2 (see FIG. 2).

The operation of the full bridge shunt inverter system 202 with the four-quadrant inverter 401 in either case 1 or case 2, and in further scenarios, is controlled by a controller 203 that has a capability to sense voltages and currents on the distribution grid 103 and the full bridge inverter's connection 205 to the distribution grid 103 via sense lines 206-1 and 206-2, respectively (see FIG. 2). The controller 203 determines the output waveform needed for either power factor correction during the normal operation or optimization of other requirements, of the distribution grid 103, by providing control inputs to the four-quadrant inverter 401 operation.

For the second case, case 2 as depicted in FIG. 3B, the connect-disconnect switch 201 may disconnect the distribution grid 103 from the power transmission grid 101. The controller 203 takes control to provide switching and current control instructions to the four-quadrant inverter 401 in the full bridge shunt inverter system 202, thereby enabling grid forming and sustaining of the continued distribution grid 103 operation when necessary.

When additional reactive load is brought on the load bus 113 of the distribution grid 103, e.g., by additional reactive loads 108 and inductive loads 107, the reactive power demand is conveyed to the distribution grid 103 through the demand-response capable controller 112 coupling the load bus 113 to the distribution grid 103. The distribution grid 103 may not be able to support this additional demand for reactive power immediately in a conventional system (e.g., system 100 of FIG. 1). This can result in a drastic voltage drop at the load bus 113 which gets transferred to the distribution grid 103 and from there to even the transmission grid 101. This can cause the distribution grid system to become unstable quickly, further cascading the instability to the supply and high voltage grids resulting in total system failure. A similar result can happen if the distribution grid 103 has a short circuit condition. When this happens surge current requirement increases. Due to the inherent nature of the FACTS based controllers 111-1, 111-2 coupling the generators 109, 110 using natural resources which provide part of the power to the distribution grid 103, the availability of short circuit current is limited. This limitation can result in the available short circuit current being insufficient to trip any protection circuits of the short circuited loads by disconnecting the shorted load from the load bus 113 or the load bus 113 from the distribution grid 103. The continued active short circuit can adversely impact the operation of the distribution grid 103, the transmission grid 101 and even the High Voltage power grid, leading to instabilities and disruption of power system.

Under these conditions the controller 203 may sense the status of the distribution grid 103 via the sense lines 206-1 and 206-2 and the connect-disconnect switch 201 is used to disconnect the transmission grid 101 from the distribution grid 103 (see FIGS. 2, 3A and 3B). The controller 203 may simultaneously bring online the full bridge shunt inverter system 202 comprising the four-quadrant inverter 401 with the charged battery/power source 204. The switching of the FACTS devices of the four-quadrant inverter 401, for example the IGBTs or thyristor switch circuits 402, is controlled by the individual controllers 501A to 501D using control inputs from the controller 203 based on the sensed distribution circuit voltage and current characteristics fed back to the controller 203 via the sense lines 206-1 and 206-2. The four-quadrant inverter controller 203 enables the switching circuits 402 of the four-quadrant inverter 401 to provide from the storage battery/power source 204 the necessary active, reactive, and distortion power needed to operate the active loads. Power to these loads on the distribution grid 103 is provided until the fault is rectified and the supply from the transmission grid 101 can take up the load requirements again when the connect-disconnect switch is closed. Such action prevents voltage collapse in the grid system, in case of higher-than-normal reactive or short circuit loading, thereby avoiding grid voltage anomalies and associated failure.

Similarly, the controller 203 is able to deliver, by adjusting the switching of the switching circuits 402 in the four-quadrant inverter 401 of the full bridge shunt inverter system 202, short circuit surge currents from the storage battery/power source 204 to activate the protection circuits for isolating the short circuited components and loads connected to the distribution grid 103 when the connect-disconnect circuit is isolating the distribution grid 103 from the transmission grid 101. The full bridge shunt inverter system 202 may also provide black-start capability to keep the distribution grid 103 and the unaffected loads on the load bus 113 re-started and operating until a resolution to the problem can be found and the connect-disconnect switch 201 reset for normal operation of the distribution grid 103.

In FIG. 3A, the power flow pattern within distribution grid system 300A is operating normally. The power from the power transmission grid 101 to the loads 106, 107 and 108 connected on the load bus 113 through the FACTS based demand response controller 112 coupling to the distribution grid 103 is shown as power flow 301. The battery of the battery/power source 204 coupled to the four-quadrant inverter 401 of the full bridge shunt inverter system 202 is charged from both the input from the power transmission grid 101 as shown in power flow arrow 302, and the green natural resource based power generated, such as from wind generator 110 and solar generator 109 as shown in power flow arrow 303. Charging of such a battery, and discharging of the battery (e.g., when the four-quadrant inverter 401 of the full bridge shunt inverter system 202 is operated as a power source) is managed in various embodiments by the controller 203 operating the four-quadrant inverter 401 of the full bridge shunt inverter system 202 in implementations specific to various types of batteries as readily devised. The green natural resource-based power generation sources, e.g., wind generator 110 and solar generator 109, are shown coupled to the distribution grid 103 via FACTS based controllers 111-1 and 111-2 (see FIG. 2). Power flow 303 also acts to provide the impedance input on to the distribution grid 103 to address power factor correction needs of the distribution grid 103 to improve power flow to the load bus 113.

FIG. 3B shows a power flow 304 from the battery/power generator source 204 to the load bus 113 to address the need for reactive power and for catering to short circuit current sufficient to activate the protection circuits when need arises when the connect-disconnect switch 102 is activated to disconnect the distribution grid 103 from the supply grid 101. The power from the battery may also provide short-term sustaining power for loads on the load bus 113 connected to the distribution grid 103 when the short circuited loads have been disconnected from circuit and prior to the reclosure switch activation to re-connect the power transmission grid 101 and the distribution grids 103 for normal operation.

Figure 4:
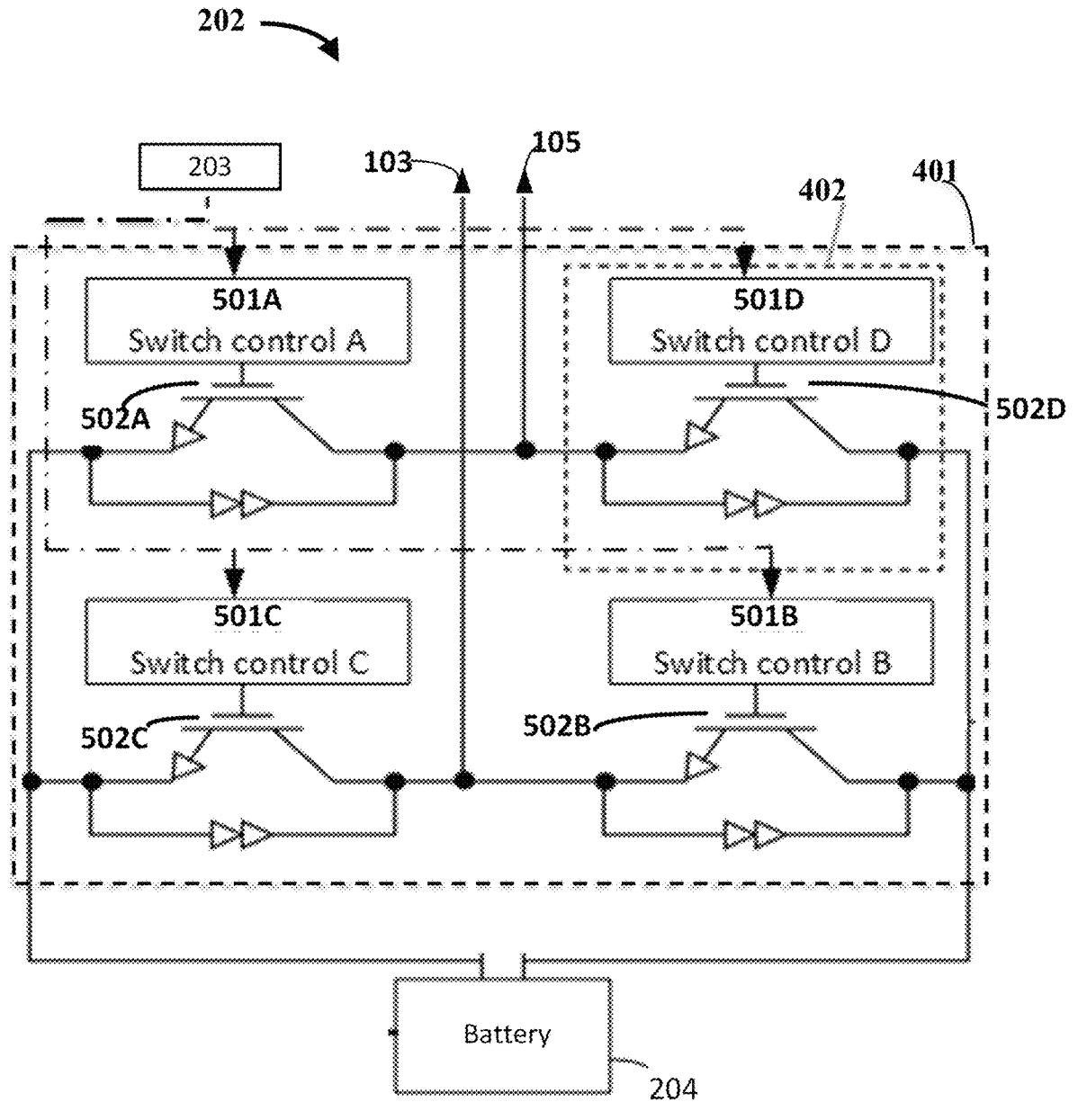
FIG. 4 is a schematic diagram of the full bridge inverter system with FACTS based impedance injection units (IIUs) usable in a 4-quadrant DC-to-AC inverter configuration for achieving scale of manufacture and cost reduction according to an embodiment.

FIG. 4 shows a full bridge shunt inverter system 202 with FACTS based four quadrant switch circuit 401 configuration, using IGBTS 502A-502D, making the switching circuits 402 of the full bridge shunt inverter system 202 in one embodiment. Though only one four quadrant switch circuit 401 is shown, it is not meant to be limiting. The full bridge shunt inverter system 202 implemented with IGBT full bridge circuits, for example, can be connected in series-parallel connections to handle differing voltages and currents demanded by different distribution grids. These switching units may be used as impedance injection units (IIUs) to inject impedance into segments of transmission lines for power flow control. The switching units are ideal for use with medium/low voltage full bridge shunt inverter system 202 to provide the necessary power factor control from the storage battery/power source 204 when the connect-disconnect switch 201 is open. By using the available switching circuits, such as IIUs, a level of manufacturing efficiency can be achieved that will allow for cost reduction of the proposed grid forming capability.

As shown in FIG. 4, the full bridge switching circuits can be implemented with the impedance injection units (IIUs) that form the four-quadrant switch circuit 401 comprising four IGBTs 502A-502D connected as a full bridge configuration with each IGBT having a switching control (e.g., switch controls 501A-501D). These switch controls 501A-501D are controlled by the controller 203 associated with the full bridge shunt inverter system 202. The bridge, of four IGBTs, thyristors or other high voltage switches in the embodiments, is connected between the distribution grid 103 and ground 105. During normal operation the storage battery/power source 204 associated with the full bridge shunt inverter system 202 is charged up from the power supplied by the power transmission grid 101 and the distributed green natural resource-based power generation capability coupled to the distribution grid 103. When there is a need to provide for power factor correction, and/or alternate current waveforms, the controller 203 is able to generate the desired current waveforms by adjusting the switch initiation and timing of the IGBTs 502A-502D to inject the required waveform into the distribution grid 103. When the load requirements on the load bus 113 change and reactive power or short circuit current is demanded by the distribution grid 103 to supply the load, the connect-disconnect switch 102 is used to disconnect the power transmission grid 101 from the distribution grid 103 and the IGBTs 502A-502D are controllably switched under control of the controller 203 to supply the needed grid forming voltage, along with the desired peak short circuit current or reactive power to the load bus 113 from the storage battery/power source 204 of the full bridge shunt inverter system 202.

This grid forming capability also enables load portion of the distribution grid 103 to be re-started from black start to enable checking to prevent any further short circuits and prevent complete shutdown of the grid during a reclosure of the switch 201. The black start enables the distribution grid 103 to activate and enable any needed protection/load disconnection devices and take corrective action before a reclosure is initiated to bring the grid system back to normal operation.

FIG. 5 shows a flow chart of the typical operation of an embodiment of the current application.

Under normal operating conditions the connect disconnect switch 201 operates in the closed state connecting the transmission grid 101 to the distribution grid 103. In this condition the load draws power in a shared fashion from the transmission grid 101 and the distributed renewable power generators 109 and 110. (S5001)

The power source, typically a bank of batteries, coupled to the four-quadrant switch circuit 401 of the full bridge shunt inverter system 202 gets charged from the power from the transmission grid 101 and the distributed generators 109 and 110 coupled to the distribution grid 103. (S5002)

The full bridge shunt inverter system controller 203 monitors the power flow in the distribution grid and using the four-quadrant switch circuit 401 of the full bridge shunt inverter system 202 generates the impedance to be injected into the distribution grid 103 to optimize the power flow by adjusting the power factor at the connected loads. (S5003).

When there is a short circuit or a large reactive power/current demand occurs, the connect disconnect switch is disconnected isolating the distribution grid 103 from the transmission grid 101, reducing the possibility of voltage instability, oscillations and other disturbances that otherwise could result in power system wide load disruption and power system shutdowns. (S5004)

The controller provides inputs to the four-quadrant switch circuit 401 to:

1. provide the necessary short circuit current to the protective circuitry of any shorted load to be activated,
2. provide any needed reactive power support to the load to reduce the impact of voltage instability,
3. enable grid formation including the ability for dark start. Also, to provide short-term sustaining capability for distribution grid 103 operation. (S5005)

The following list shows the types of power conditions addressable by the full bridge shunt inverter system 202 enabled with grid forming capability described herein. Power conditions and capabilities include, but are not limited to, the following:

1. Generate impedance, inductive or capacitive as required and injected to correct for the power factor of the power supplied to the load under normal operating conditions.
2. The ability to make sure that the power supplied to the load is a sinusoid for optimum load functionality.
3. Provide sufficient short circuit and surge current to the distribution grid to activate any protection circuitry to isolate the problem loads.
4. Provide power supply to the connected loads for operation while any issues on the distribution grid are resolved.
5. Supply any sudden requirements of reactive power that can create voltage instability of the distribution grid, due to turn on of motor or other high reactive power demand loads.

6. Enable dark start capability to the distribution grid, once the recovery operation from grid failure is complete.

As discussed above, the full bridge shunt inverter system 202 enabled with grid forming capability disclosed for the distribution grid will enable the distribution grid to be more effective in providing the necessary capabilities to handle the connected loads and recover form short circuits and other voltage instability problems without damaging the overall power grid functionality.

While the disclosure has been described in terms of several preferred embodiments, those of ordinary skill in the art will recognize that the disclosure is not limited to the embodiments described but can be practiced with modification and alteration within the spirit and scope of the appended claims. Advances in technology will also provide for additional ways to practice the embodiments described herein. These are anticipated and covered by the current application. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A system with grid forming capability, comprising:
   a control module;
   a connect-disconnect switch configured to accept inputs from the control module to connect or disconnect a first segment of a distribution grid to or from a second segment of the distribution grid, wherein the first segment of the distribution grid is transformer coupled to a power transmission grid through a step-down transformer operable to convert a high voltage of the power transmission grid to a medium or low voltage of the distribution grid, wherein when the connect-disconnect switch disconnects the first segment of the distribution grid from the second segment of the distribution grid, the second segment of the distribution grid is disconnected from the power transmission grid;
   a shunt inverter system connectable to the second segment of the distribution grid, the shunt inverter system comprising a 4-quadrant DC-to-AC inverter connectable to a battery;
   a plurality of flexible alternating current (AC) transmission system (FACTS) based controllers configured to couple energy generators to the second segment of the distribution grid; and
   a demand-response controller configured to couple a plurality of loads to the second segment of the distribution grid;
   wherein the control module is configured to:
      control the connect-disconnect switch to disconnect the second segment of the distribution grid from the first segment of the distribution grid when a reactive load is present in the distribution grid, or a short circuit happens in the power transmission grid or the distribution grid;
      provide switching instructions to the 4-quadrant DC-to-AC inverter to provide a power factor correction to the distribution grid when the connect-disconnect switch connects the first segment of the distribution grid to the second segment of the distribution grid;
      operate the shunt inverter system with switching instructions for voltage and current control by the 4-quadrant DC-to-AC inverter to sustain continued operation of the distribution grid; and perform grid formation of the distribution grid using the 4-quadrant DC-to-AC inverter and power from the battery, after recovery operation from grid failure, when the connect-disconnect switch has disconnected the distribution grid from the power transmission grid;

wherein:

when the connect-disconnect switch is closed, power to charge the battery of the shunt inverter system and power to the plurality of loads coupled to the second segment of the distribution grid, through the demand-response controller, is supplied by the power transmission grid through the closed connect-disconnect switch; and when the connect-disconnect switch is open, (i) the battery is charged and power to the plurality of loads is supplied by the energy generators, (ii) the power to the plurality of loads is supplied by the energy generators in conjunction with power from the shunt inverter system, or (iii) the power to the plurality of loads is supplied by the shunt inverter system acting in a grid formation mode.

2. The system of claim 1, wherein the shunt inverter system is a full bridge shunt inverter system.

3. The system of claim 1, wherein:

the control module is further configured to provide switching instructions to the 4-quadrant DC-to-AC inverter operable as a voltage and current source using the battery.

4. The system of claim 1, wherein:

the control module is further configured to operate the 4-quadrant DC-to-AC inverter to charge the battery power drawn from the power transmission grid or power generated by the energy generators, and to use the battery in operation of the 4-quadrant DC-to-AC inverter as a power source to provide the power factor correction to the distribution grid.

5. The system of claim 1, wherein the control module is further configured to operate a plurality of switches of the 4-quadrant DC-to-AC inverter to convert an input current waveform of the distribution grid to a total harmonic distortion (THD) controlled sinusoid waveform to be supplied to the distribution grid.

6. The system of claim 1, wherein the 4-quadrant DC-to-AC inverter of the shunt inverter system comprises at least one full bridge inverter having a plurality of switches each comprising an insulated gate bipolar transistor (IGBT) or a power electronic switch.

7. The system of claim 1, wherein:

the control module is enabled to sense voltages and currents of the distribution grid via sense lines.

8. A method for operation of a system that is coupled to a distribution grid and a power transmission grid, the method comprising:

controlling, through a control module, a connect-disconnect switch to connect or disconnect a first segment of the distribution grid to or from a second segment of the distribution grid having a plurality of loads, each load coupled to the second segment of the distribution grid via a demand-response controller, the second segment of the distribution grid further having a plurality of energy generators, each energy generator coupled to the second segment of the distribution grid via a flexible alternating current (AC) transmission system (FACTS) based controller, wherein the second segment of the distribution grid is coupled to a shunt inverter system comprising a 4-quadrant DC-to-AC inverter and a battery, wherein the first segment of the distribution grid is transformer coupled to the power transmission grid through a step-down transformer operable to convert a high voltage of the power transmission grid to a medium or low voltage of the distribution grid;

providing, through the control module, switching instructions to the 4-quadrant DC-to-AC inverter to provide a power factor correction to the plurality of loads when the connect-disconnect switch connects the first segment of the distribution grid to the second segment of the distribution grid, thereby connecting the power transmission grid to the second segment of the distribution grid with the plurality of loads and the plurality of energy generators;

operating, through the control module, the shunt inverter system to provide switching and current control instructions to sustain continued operation of the distribution grid in an event the connect-disconnect switch has disconnected the first segment of the distribution grid from the second segment of the distribution grid;

performing, through the control module operating the connect-disconnect switch and the 4-quadrant DC-to-AC inverter, a restart and grid formation of the distribution grid after recovery operation from a grid failure of the second segment of the distribution grid coupled to the plurality of loads; and operating, through the control module, the system in the following modes:

when the connect-disconnect switch is closed, power to charge the battery of the shunt inverter system and power to the plurality of loads, through the demand-response controller, is supplied by the power transmission grid through the closed connect-disconnect switch; and when the connect-disconnect switch is open, (i) the battery is charged and power to the plurality of loads is supplied by the plurality of energy generators, (ii) the power to the plurality of loads is supplied by the energy generators in conjunction with power from the shunt inverter system, or (iii) the power to the plurality of loads is supplied by the shunt inverter system acting in a grid formation mode.

9. The method of claim 8, wherein the shunt inverter system is a full bridge shunt inverter system.

10. The method of claim 8, further comprising:

operating, through the control module, the 4-quadrant DC-to-AC inverter to act as a power source to provide the power factor correction to the plurality of loads, using the battery.

11. The method of claim 8, further comprising:

operating, through the control module, the 4-quadrant DC-to-AC inverter to charge the battery from power drawn from the power transmission grid or from power generated by the plurality of energy generators; and operating, through the control module, the 4-quadrant DC-to-AC inverter to act as a power source that uses the battery to provide the power factor correction input to the distribution grid.

12. The method of claim 8, further comprising:

operating, through the control module, a plurality of switches of the 4-quadrant DC-to-AC inverter to supply current input to the distribution grid to correct the current waveform from the transmission grid to a total harmonic distortion (THD) controlled sinusoid waveform to be supplied to the plurality of loads.

13. The method of claim 8, further comprising:

sensing, by the control module, voltages and currents of the distribution grid provided to the plurality of loads via sense lines.

14. The method of claim 8, further comprising:

performing, through the control module operating the connect-disconnect switch and the 4-quadrant DC-to-AC inverter, a dark start of the distribution grid after recovery operation from grid failure.

15. The method of claim 8, wherein the 4-quadrant DC-to-AC inverter includes a plurality of switches, and each of the plurality of switches comprises at least an insulated gate bipolar transistor (IGBT).

16. A tangible, non-transitory, computer-readable media having instructions thereupon which, when executed by a processor, cause the processor to perform operations comprising:

controlling, through a control module, a connect-disconnect switch to connect or disconnect a first segment of a distribution grid to or from a second segment of the distribution grid, the first segment of the distribution grid being transformer coupled to a power transmission grid through a step-down transformer operable to convert a high voltage of the power transmission grid to a medium or low voltage of the distribution grid, the second segment having energy generators coupled to the second segment via flexible alternating current (AC) transmission system (FACTS) based controllers, the second segment further having a plurality of loads coupled to the second segment via a demand-response controller, the second segment having a battery coupled to the second segment via a 4-quadrant DC-to-AC inverter as a shunt inverter system, wherein when the connect-disconnect switch connects the first segment of the distribution grid to the second segment of the distribution grid, the second segment of the distribution grid is connected to the power transmission grid, wherein when the connect-disconnect switch disconnects the first segment of the distribution grid from the second segment of the distribution grid, the second segment of the distribution grid is disconnected from the power transmission grid;

operating, through the control module, the connect-disconnect switch to connect the first segment of the distribution grid to the second segment of the distribution grid thereby connecting the distribution grid to the power transmission grid wherein power to the plurality of loads is supplied by power from the energy generators and power from the power transmission grid;

operating, through the control module, the connect-disconnect switch to disconnect the second segment of the distribution grid from the first segment of the distribution grid;

providing, through the control module, switching instructions to the 4-quadrant DC-to-AC inverter to provide a power factor correction to the plurality of loads coupled to the second segment of the distribution grid when the second segment of the distribution grid is connected to the power transmission grid;

operating, through the control module, the shunt inverter system to provide switching and current control instructions to sustain continued operation of the plurality of loads when the second segment of the distribution grid is disconnected from the transmission grid;

operating, through the control module, the connect-disconnect switch and the shunt inverter system, to perform a restart and grid formation of the second segment of the distribution grid after recovery operation from grid failure; and operating, through the control module, in the following modes:

when the connect-disconnect switch is closed, power to charge the battery of the shunt inverter system and power to the plurality of loads, through the demand-response controller, is supplied by the power transmission grid through the closed connect-disconnect switch; and when the connect-disconnect switch is open, (i) the battery is charged and power to the plurality of loads is supplied by the energy generators, (ii) the power to the plurality of loads is supplied by the energy generators in conjunction with power from the shunt inverter system, or (iii) the power to the plurality of loads is supplied by the shunt inverter system acting in a grid formation mode.

17. The tangible, non-transitory, computer-readable media of claim 16, wherein the operations further comprise:

operating, through the control module, the shunt inverter system to operate as a power source to provide the power factor correction inputs to the distribution grid, using the battery.

18. The tangible, non-transitory, computer-readable media of claim 16, wherein the operations further comprise:

operating, through the control module, the 4-quadrant DC-to-AC inverter to charge the battery from the power transmission grid or the energy generators; and operating, through the control module, the 4-quadrant DC-to-AC inverter as a power source that uses the battery to provide the power factor correction inputs to the plurality of loads.

19. The tangible, non-transitory, computer-readable media of claim 16, wherein the operations further comprise:

operating, through the control module, a plurality of switches of the 4-quadrant DC-to-AC inverter to correct the current waveform from the transmission grid to a total harmonic distortion (THD) controlled sinusoid waveform to the plurality of loads.

20. The tangible, non-transitory, computer-readable media of claim 16, wherein the operations further comprise:

sensing, by the control module, voltages and currents of the second segment of the distribution grid via sense lines.

* * * * *